United States Patent
Gagnon

(10) Patent No.: US 8,646,984 B2
(45) Date of Patent: Feb. 11, 2014

(54) CELLULAR ENCASEMENT PROTECTION SYSTEM FOR ROLLER ASSEMBLY

(76) Inventor: Jean-Pierre Gagnon, Quebec (CA)

( * ) Notice: Subject to any disclaimer, the term of this patent is extended or adjusted under 35 U.S.C. 154(b) by 1189 days.

(21) Appl. No.: 12/294,340

(22) PCT Filed: Mar. 23, 2007

(86) PCT No.: PCT/CA2007/000484
§ 371 (c)(1),
(2), (4) Date: Jan. 6, 2009

(87) PCT Pub. No.: WO2007/112553
PCT Pub. Date: Oct. 11, 2007

(65) Prior Publication Data
US 2009/0169146 A1    Jul. 2, 2009

Related U.S. Application Data

(60) Provisional application No. 60/787,511, filed on Mar. 31, 2006.

(51) Int. Cl.
*F16C 33/80* (2006.01)
*B65G 13/00* (2006.01)

(52) U.S. Cl.
USPC ............. 384/480; 384/462; 384/419; 193/37; 184/18

(58) Field of Classification Search
USPC ......... 384/477, 480, 484, 462, 144, 147, 418, 384/419, 546, 587; 277/347, 409, 411, 277/418–420, 421; 184/6.18, 18, 19; 193/37, 35 R
See application file for complete search history.

(56) References Cited

U.S. PATENT DOCUMENTS

| | | | | |
|---|---|---|---|---|
| 937,916 A * | 10/1909 | Bentley | ......................... | 277/420 |
| 3,070,410 A * | 12/1962 | Derks | ........................... | 384/415 |
| 3,144,280 A | 8/1964 | Sorenson | | |
| 3,610,387 A | 10/1971 | Stein et al. | | |
| 3,984,160 A | 10/1976 | Sheldon et al. | | |
| 5,025,917 A * | 6/1991 | Smith et al. | ................... | 198/842 |
| 5,028,054 A * | 7/1991 | Peach | .......................... | 277/348 |
| 5,046,869 A * | 9/1991 | Roberts et al. | ................ | 384/537 |
| 5,221,095 A * | 6/1993 | Orlowski | ...................... | 277/303 |
| 5,383,549 A * | 1/1995 | Mayer | .......................... | 198/842 |

(Continued)

FOREIGN PATENT DOCUMENTS

CA    1031715    5/1978
CA    2092856    5/1995

(Continued)

*Primary Examiner* — Daniel Yabut
(74) *Attorney, Agent, or Firm* — Fish & Richardson P.C.

(57) ABSTRACT

A roller assembly having a roller tube, a fixed shaft inside the roller tube, a bearing mounted on the shaft, an inner casing mounted on the bearing and rotatable with respect to the shaft, an outer casing fixedly mounted on the shaft, a shield cap mounted on the inner casing, and a seal member mounted between the roller tube, the shield cap and the inner casing for sealing the roller assembly. Facing walls of the inner casing and outer casing define inner cells and a first labyrinth path for reducing migration of contaminants through the inner cells. Facing walls of the outer casing and shield cap define outer cells and a second labyrinth path for reducing migration of contaminants through the outer cells. The facing walls of the outer casing and shield cap are provided with gel for further reducing migration of contaminants through the outer cells.

5 Claims, 4 Drawing Sheets

(56) References Cited

U.S. PATENT DOCUMENTS

| | | | |
|---|---|---|---|
| 5,433,308 A | 7/1995 | Gagnon | |
| 5,476,326 A * | 12/1995 | Ueno et al. | 384/125 |
| 6,148,986 A * | 11/2000 | Brink et al. | 193/37 |
| 6,287,014 B1 * | 9/2001 | Salla | 384/546 |
| 6,641,512 B2 * | 11/2003 | Bryant et al. | 492/16 |
| 6,802,410 B2 * | 10/2004 | Dyson et al. | 193/37 |
| 6,945,699 B2 * | 9/2005 | Tibbits | 384/462 |

FOREIGN PATENT DOCUMENTS

| | | |
|---|---|---|
| CA | 2141125 | 12/1995 |
| CA | 2240742 | 1/1999 |
| CA | 2290522 | 6/2000 |
| CA | 2269435 | 8/2000 |

\* cited by examiner

GEL

CELLULAR ENCASEMENT PROTECTION SYSTEM FOR ROLLER ASSEMBLY

CROSS REFERENCE TO PRIOR APPLICATION

This application is the U.S. national phase of International Application No. PCT/CA2007/000484, filed Mar. 23, 2007, which claims priority from U.S. Provisional Application No. 60/787,511, filed Mar. 31, 2006. The disclosures of both are incorporated herein by reference in their entirety.

FIELD OF THE INVENTION

The present invention relates to a roller assembly to be used, for example, as a conveyor roller.

BACKGROUND OF THE INVENTION

Usually, roller assemblies comprise a cylindrical tube which rotates on a shaft by means of bearings. The main problem of a conventional roller assembly is the damage of its bearings due to exterior contaminants.

Known in the art, there is U.S. Pat. No. 5,433,308 (GAGNON) which discloses a roller assembly that is very efficient in preventing external contamination of bearings. However, this type of roller still allows some degree of contamination of the bearings from the outside environment. Furthermore, grease that is inside the bearings may come out of the roller assembly and contaminate products that come into contact with the roller assembly. This makes this roller more difficult to use with food products or other products that cannot be contaminated by the bearing grease.

Accordingly, there is a need in the market for a roller assembly that further reduces the contamination to its bearings and that also further reduces the reverse contamination from the bearings to the outside environment.

SUMMARY OF THE INVENTION

According to the present invention, there is provided a roller assembly comprising:
  a roller tube;
  a fixed shaft inside the roller tube;
  a bearing mounted on the shaft;
  an inner casing mounted on the bearing and rotatable with respect to the shaft;
  an outer casing fixedly mounted on the shaft;
  a shield cap mounted on the inner casing; and
  a seal member mounted between the roller tube, the shield cap and the inner casing for sealing the roller assembly, wherein facing walls of the inner casing and outer casing define inner cells, the facing walls of the inner casing and the outer casing being provided with a first series of spaced apart fins extending perpendicularly with respect to the facing walls of the inner casing and the outer casing, the first series of fins being positioned so as to define a first labyrinth path for reducing migration of contaminants through the inner cells, facing walls of the outer casing and shield cap defining outer cells, the facing walls of the outer casing and shield cap being provided with a second series of spaced apart fins extending perpendicularly with respect to the facing walls of the outer casing and shield cap, the second series of fins being positioned so as to define a second labyrinth path for reducing migration of contaminants through the outer cells, and the facing walls of the outer casing and shield cap being provided with gel for further reducing migration of contaminants through the outer cells.

The invention as well as its numerous advantages will be better understood by reading of the following non-restrictive description of preferred embodiments made in reference to the appended drawings.

DESCRIPTION OF PREFERRED EMBODIMENTS

Figure 1:
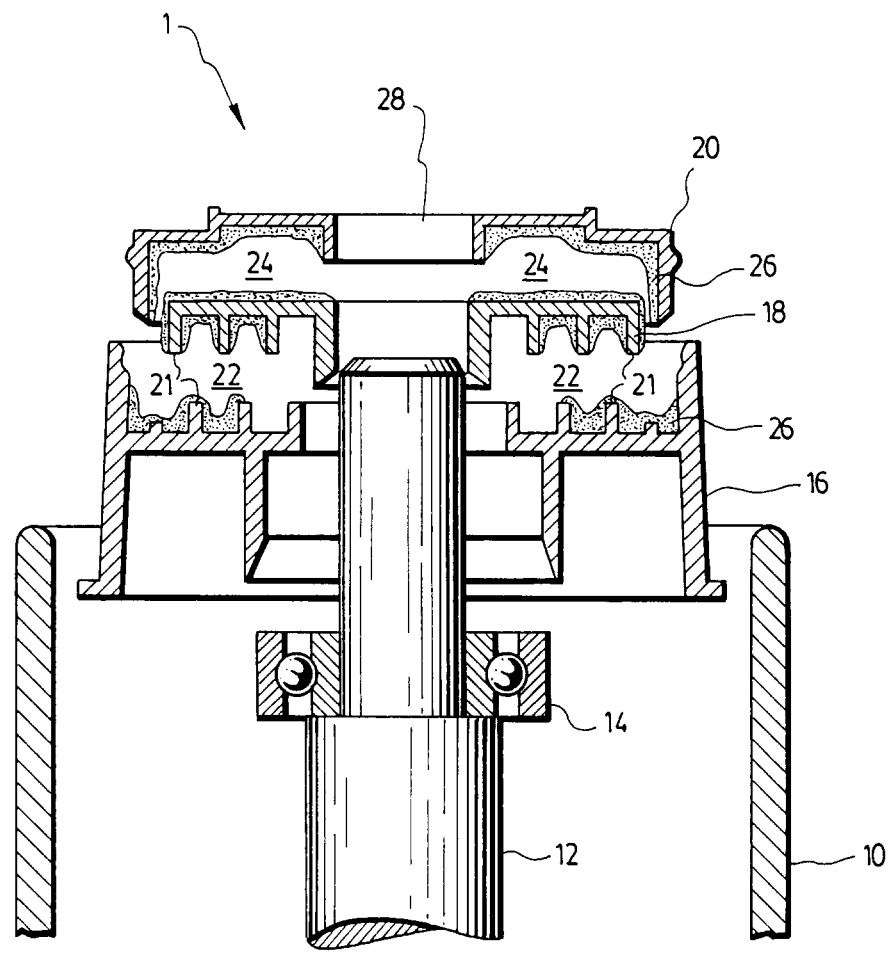
FIG. 1 is an exploded section view of part of a known encasement protection system for a roller assembly using only grease.

Referring to FIG. 1, there is shown a roller assembly 1 using a known encasement protection system that has some similarities to the roller design disclosed in U.S. Pat. No. 5,433,308 (GAGNON). The roller assembly 1 includes a roller tube 10, a fixed shaft 12 inside the roller tube 10, a bearing 14 mounted on the shaft 12, a pivoting inner casing 16 mounted on the bearing 14, a fixed outer casing 18 mounted on the shaft 12, and a shield cap 20 mounted on the inner casing 16. The facing walls of the inner casing 16 and outer casing 18 are provided with perpendicular fins 21 that define inner cells 22 and a labyrinth path filled with grease 26. The facing walls of the outer casing 18 and shield cap 20 define an outer cell 24. The walls of the outer cell 24 are also provided with grease 26. The purpose of the grease 26 is to prevent contamination from entering through the axial opening 28 of the shaft 12 and penetrating into the bearing 14. However, it has been discovered by the Applicant that this configuration does not fully prevent contaminants to reach the bearings 14 because of characteristics inherent to the filling grease 26 used. More specifically, compromises need to be made between viscosity required for keeping contaminants from penetrating and the fluidity required to grease adequately the bearings 14 and allow them to roll more freely. The grease 26 being non-adherent, this makes the compromises even more difficult and reduces the system's efficiency. Furthermore, grease inside the bearing 14 and grease 26 in the inner and outer cells 22, 24 may come out through the axial opening 28 and contaminate the outside environment, which is not desirable in case of food products applications for example.

Figure 2:
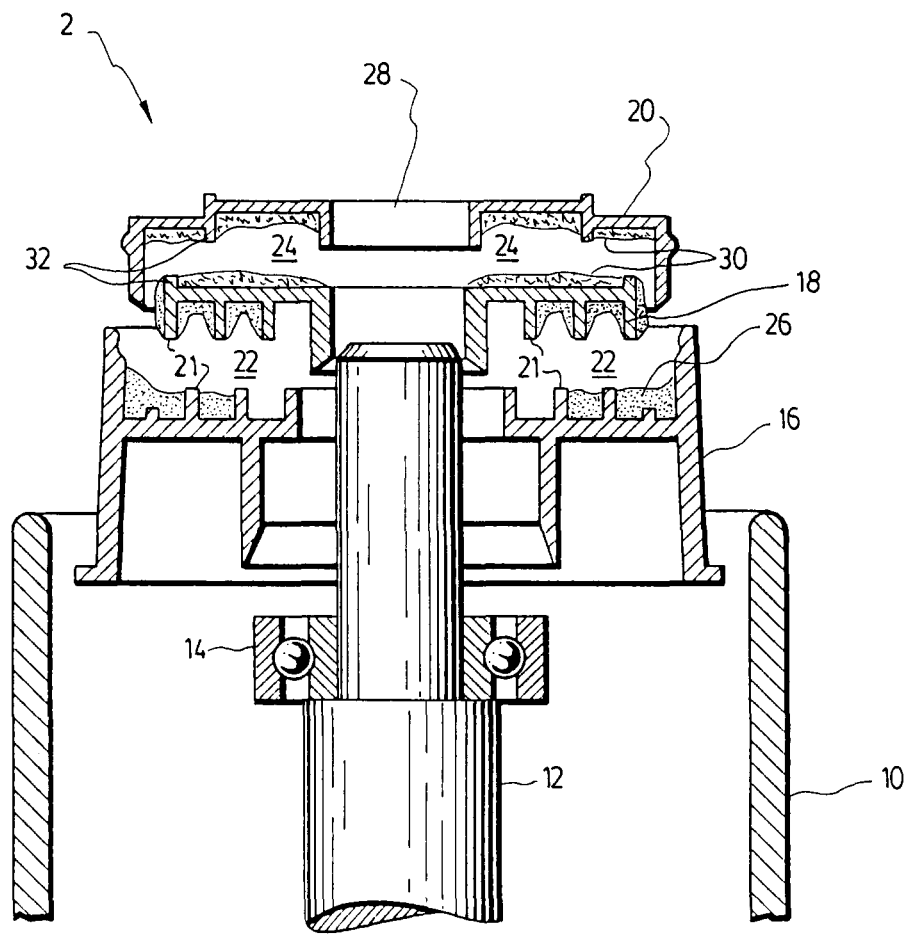
FIG. 2 is an exploded section view of part of a cellular encasement protection system for a roller assembly using gel in the outer cells and grease in the inner cells, according to a preferred embodiment of the present invention.
Figure 4:
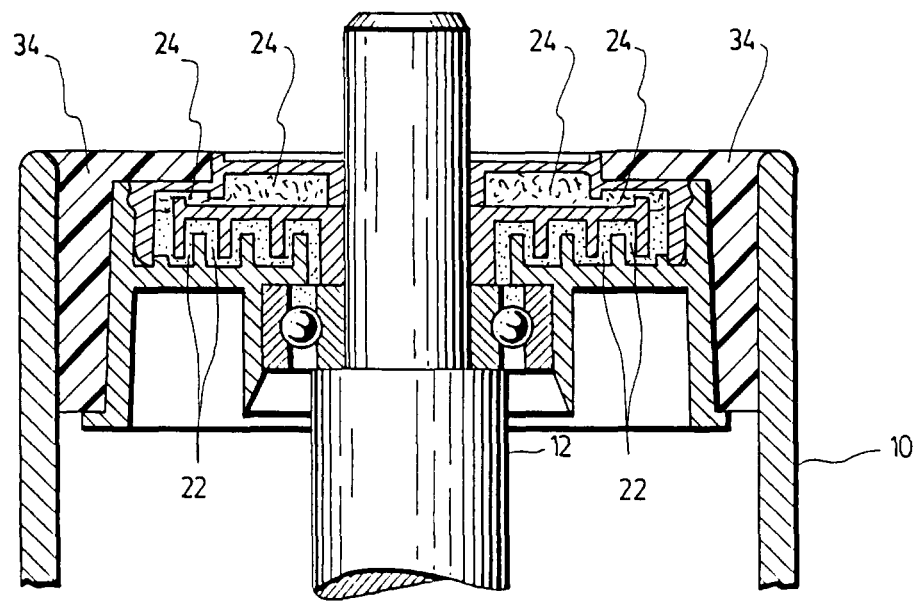
FIG. 4 is a section view of a part of the encasement protection system shown in FIG. 2, in an assembled position.

Referring to FIGS. 2 and 4, there is shown a roller assembly roller assembly 1 according to a preferred embodiment of the present invention. The roller assembly includes a roller tube 10, a fixed shaft 12 inside the roller tube 10, a bearing 14 mounted on the shaft 12, an inner casing 16 mounted on the bearing 14 and rotatable with respect to the shaft 12, an outer casing 18 fixedly mounted on the shaft 12, a shield cap 20 mounted on the inner casing 16, and a seal member 34 preferably made of polymer mounted between the roller tube 10, the shield cap 20 and the inner casing 16 for sealing the roller assembly 1. Facing walls of the inner casing 16 and outer casing 18 define inner cells 22. The facing walls of the inner casing 16 and the outer casing 18 are provided with a first series of spaced apart fins 21 extending perpendicularly with respect to the facing walls of the inner casing 16 and the outer casing 18. The first series of fins 21 are positioned so as to define a first labyrinth path for reducing migration of contaminants through the inner cells 22. Facing walls of the outer casing 18 and shield cap 20 define outer cells 24. The facing walls of the outer casing 18 and shield cap 20 are provided with a second series of spaced apart fins 32 extending perpendicularly with respect to the facing walls of the outer casing 18 and shield cap 20. The second series of fins 32 are positioned so as to define a second labyrinth path for reducing migration of contaminants through the outer cells 24. The facing walls of the outer casing 18 and shield cap 20 are provided with gel 30 for further reducing migration of contaminants through the outer cells 24.

The gel 30 is preferably a colloid system in which a porous network of interconnected nanoparticles spans the volume of a liquid medium. The colloids form a substance with components of one or two phases. The colloidal system of the gel forms a heterogeneous mixture where very small particles of one substance are distributed evenly through another substance, in a manner that prevents them from being filtered easily or settled rapidly. The gel has the properties of a semisolid material, such as jelly or gelatine. The size of the particles may vary from 1 nanometer to 1000 nanometers in diameter. The gel 30 keeps its structural integrity inside a range of temperatures spanning from −40 degrees Fahrenheit (−40 degrees Celcius) up to 750 degrees Fahrenheit (399 degrees Celcius).

The grease 26 in the inner cell 22 is preferably chosen to be the most fluid grease possible. The grease 26 in the inner cell 22 is also chosen for its lubricating function to protect the bearing 14 against friction and functions as a reservoir of grease for the bearing 14. On the other hand, the gel 30 in the outer cells 24 is chosen to have a sufficient viscosity to allow less infiltration of outside contaminants. Furthermore, the gel 30 in the outer cells 24 also prevents a loss of grease from the bearing 14 and from the inner cells 22 to go to the outside environment and though the axial opening 28. The gel 30 is chosen for its adherence. It will be understood by persons skilled in the art that the characteristics of the gel 30 may vary according to the specific applications of the roller assembly. It will also be understood by persons skilled in the art that the number of inner cells 22 and outer cells 24 may vary according to the specific applications of the roller assembly.

Figure 3:
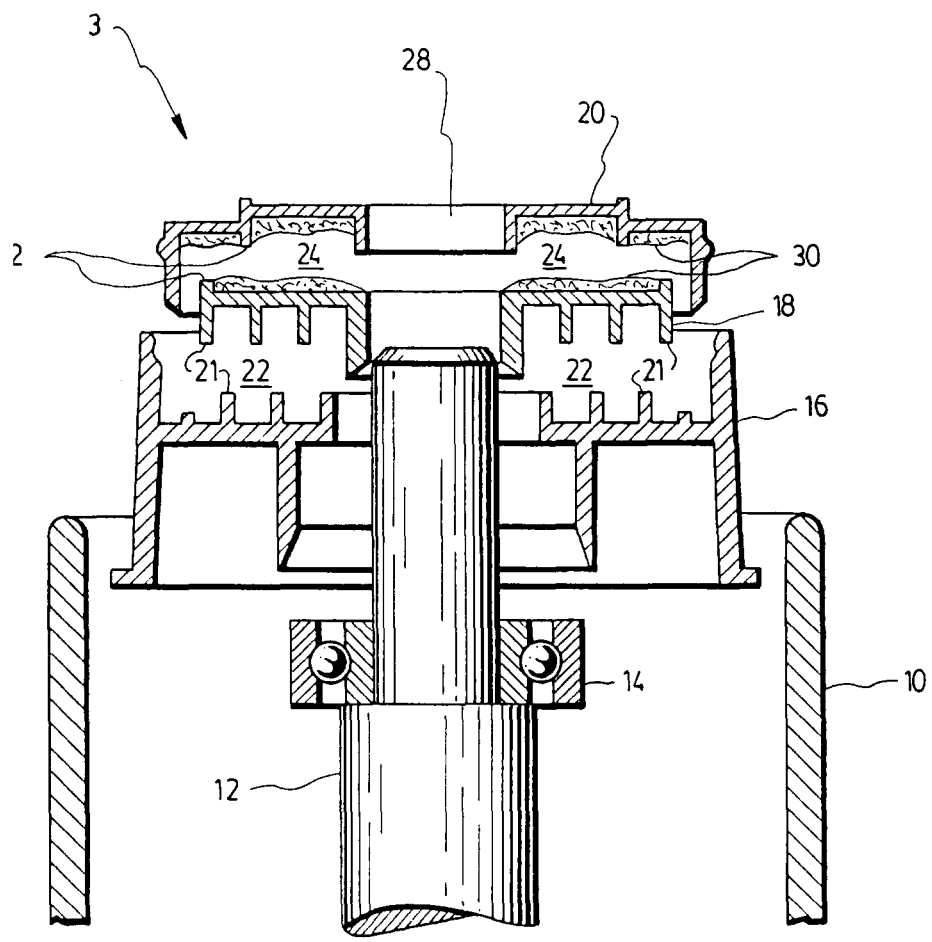
FIG. 3 is an exploded section view of a part of a cellular encasement protection system for a roller assembly using gel in the outer cells and no grease in the inner cells, according to another preferred embodiment of the present invention.
Figure 3:

Referring to FIG. 3, there is shown a roller assembly 3 using a cellular encasement protection system similar to the one shown in FIG. 2, but where the grease 26 in the inner cell 22 has been removed. Indeed, there may be some applications where there is no need for the use of extra grease for the bearings 14. This configuration may still have the same advantages as the one shown in FIG. 2. Indeed, the gel 30 still provides a barrier to outside contaminants, while at the same time it is a barrier to grease that may migrate from the bearing 14. However, it is preferable in some cases to use grease 26 in the inner cell 22 as shown in FIG. 2 because the gel 30 may contaminate the bearing 14. Indeed, the gel 30 is compatible with grease 26 but is not formulated for lubrication of bearings 14.

The inner casing 16, outer casing 18, and shield cap 20 forming the inner and outer cells 22, 24, as well as other parts may be manufactured with many different materials including, but not limited to steel, plastics, engineering plastics, polymers, rubbers, polyethylenes, composite materials, nylons, pultrusion, ceramics, fibreglass, etc.

The present invention will help users to make extreme application conveyors that were difficult if not impossible to make previously because all well known roller manufacturers use grease.

The present invention also creates a sizeable energy savings by reducing drag without compromising bearing protection. This results in an increase of rollers life in terms of guaranteed operating time expectancy, and also replacement costs savings.

The present invention will also create a wider special product offering for special needs industries like food processing, chemical products, smelting, etc. and for considerations like corrosion, abrasion, extreme temperature, fine dust, rotation speed, weight reduction, etc.

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

The invention claimed is:

1. A roller assembly comprising:
   a roller tube;
   a fixed shaft inside the roller tube;
   a bearing mounted on the shaft; an inner casing mounted on the bearing and rotatable with respect to the shaft;
   an outer casing fixedly mounted on the shaft;
   a shield cap mounted on the inner casing; and
   a seal member mounted between the roller tube, the shield cap and the inner casing for sealing the roller assembly, wherein facing walls of the inner casing and outer casing define inner cells,
   the facing walls of the inner casing and the outer casing being provided with a first series of spaced apart fins extending perpendicularly with respect to the facing walls of the inner casing and the outer casing, the first series of fins being positioned so as to define a first labyrinth path for reducing migration of contaminants through the inner cells,
   facing walls of the outer casing and shield cap defining outer cells, the facing walls of the outer casing and shield cap being provided with a second series of spaced apart fins extending perpendicularly with respect to the facing walls of the outer casing and shield cap,
   the second series of fins being positioned so as to define a second labyrinth path for reducing migration of contaminants through the outer cells, and
   the facing walls of the outer casing and shield cap being provided with gel for further reducing migration of contaminants through the outer cell,
   the inner cells being filled with grease so as to provide a reservoir of grease for lubricating the bearing,
   wherein the grease has a fluid composition and
   wherein the gel has a semisolid composition which is different from the fluid composition of the grease in order to reduce loss of the grease from the inner cells to an outside environment of the roller assembly.

2. The roller assembly according to claim 1, wherein the gel is a colloid system which comprises a porous network of interconnected nanoparticles spannings the volume of a liquid medium.

3. The roller assembly according to claim 2, wherein the nanoparticles have diameters of 1 nanometer to 1000 nanometers.

4. The roller assembly of claim 2 wherein the gel is not formulated for lubrication of the bearing.

5. The roller assembly of claim 2 wherein the gel has sufficient viscosity to reduce infiltration of outside contaminants.

* * * * *